Sept. 22, 1942.   A. CLAUD-MANTLE   2,296,424
HOOD CONTROL FOR MOTOR CARS
Filed April 19, 1941   4 Sheets-Sheet 1
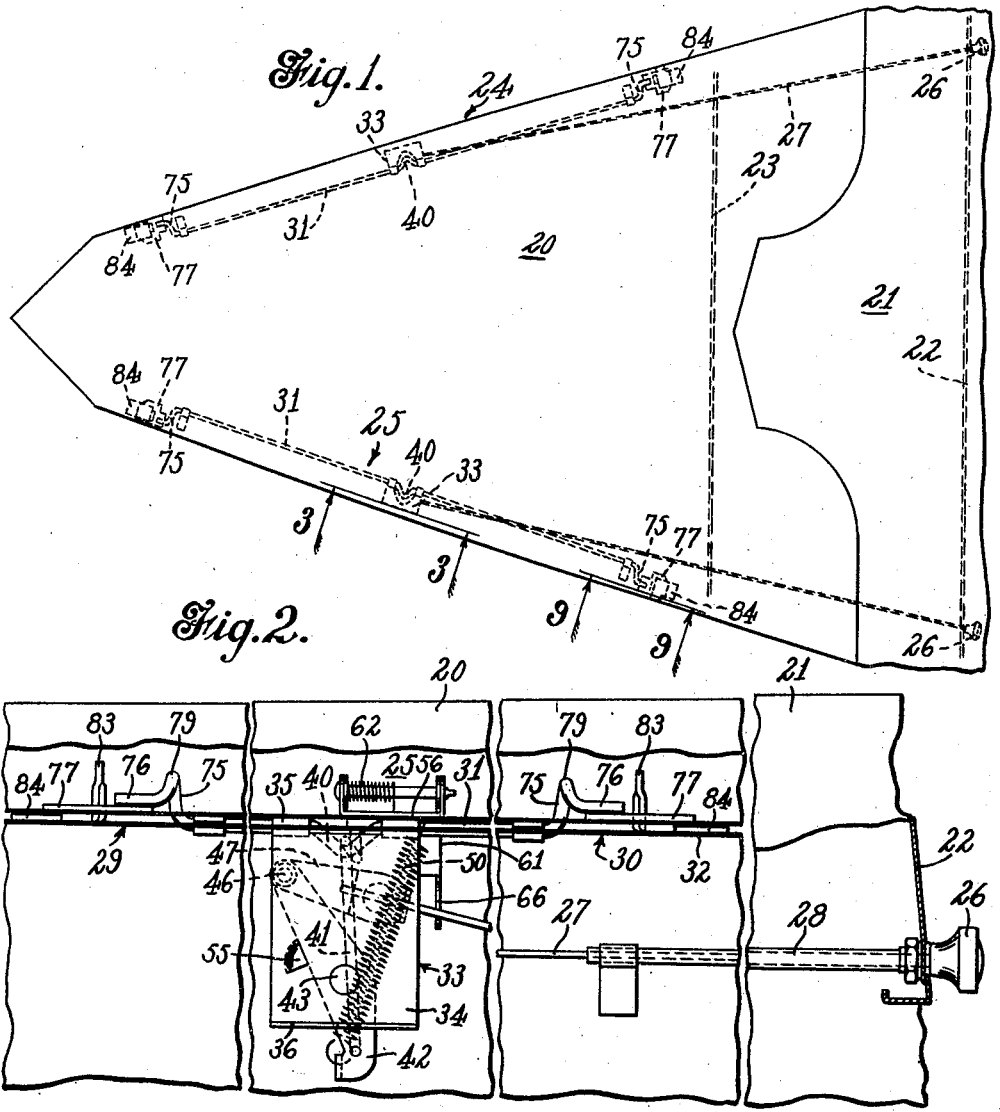
Inventor
Arthur Claud-Mantle
By Rockwell Bartholow
Attorneys Sept. 22, 1942.  A. CLAUD-MANTLE  2,296,424
HOOD CONTROL FOR MOTOR CARS
Filed April 19, 1941  4 Sheets-Sheet 2

Inventor
Arthur Claud-Mantle
By Rockwell & Bartholow
Attorneys

Sept. 22, 1942.　　　A. CLAUD-MANTLE　　　2,296,424
HOOD CONTROL FOR MOTOR CARS
Filed April 19, 1941　　　4 Sheets-Sheet 3
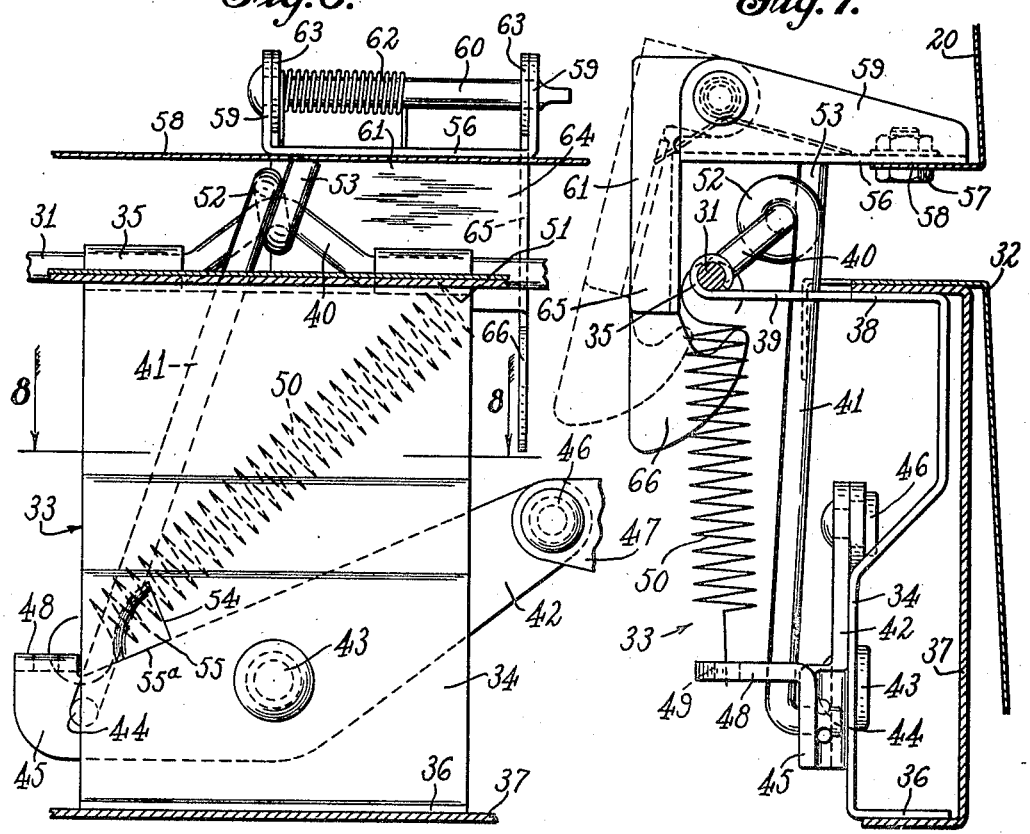
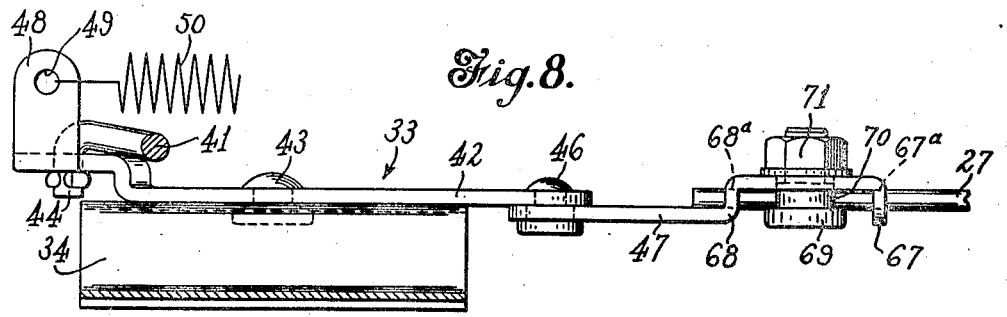
Inventor
Arthur Claud-Mantle
By Rockwell & Bartholow
Attorneys

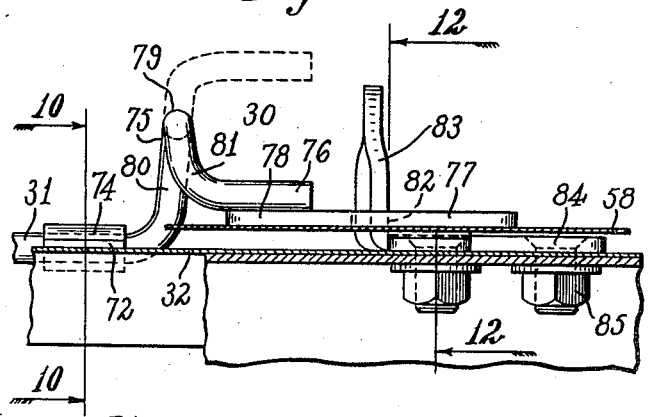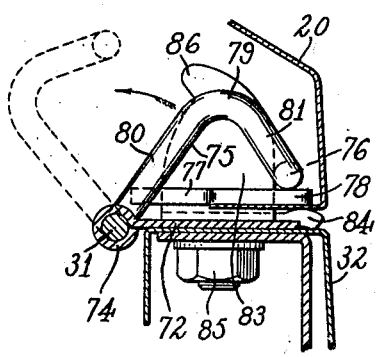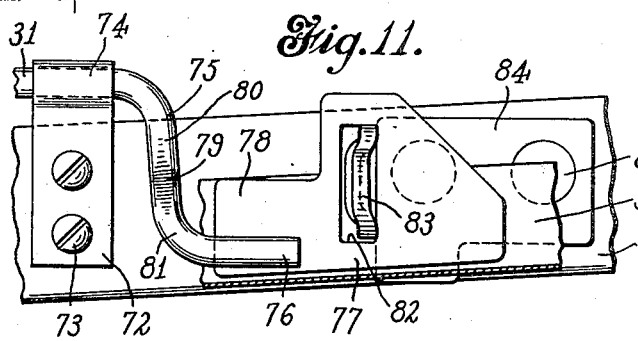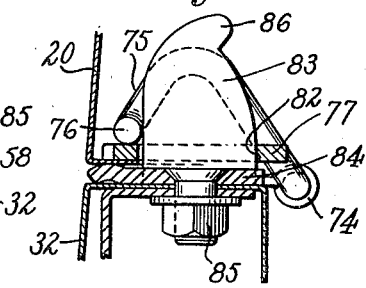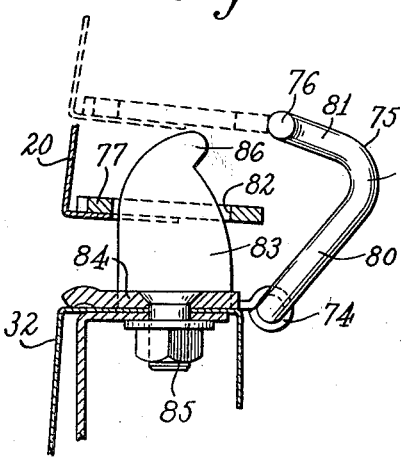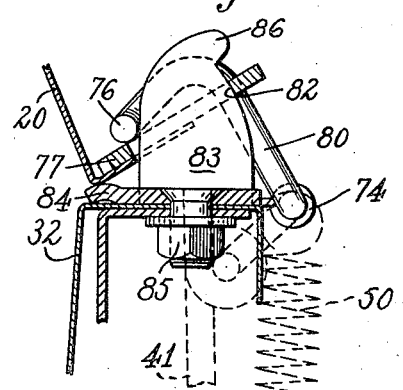

Patented Sept. 22, 1942

2,296,424

UNITED STATES PATENT OFFICE 2,296,424

HOOD CONTROL FOR MOTOR CARS

Arthur Claud-Mantle, Trumbull, Conn., assignor to The Bassick Company, Bridgeport, Conn., a corporation of Connecticut Application April 19, 1941, Serial No. 389,393

10 Claims. (Cl. 16—128.1)

This invention relates to hood controls for motor cars, and it has special reference to latching mechanisms concealed within the hood portion of the car and releasable only from the interior of the car. The invention also has special reference to latching mechanisms used with a hood comprising a relatively rigid member swinging in a direction transversely to the car and adapted to be swung upwardly from either side, as may be desired, and to be lifted completely off of the lower support when that is desired.

Latching mechanisms have been used in connection with hoods of the kind mentioned, but my invention is directed to certain improvements, including, among others, the provision of a device of this type in which the release of the latch mechanisms can be effected from the interior of the car in a convenient and effective manner so that access to the interior of the hood can be confined to authorized persons.

Another object which I have in view is the provision of improved means for raising what may be termed a "side-pivoted" hood to a limited degree as soon as the latch mechanism has been released.

To these and other ends the invention consists in the novel features and combinations of parts to be hereinafter described and claimed.

In the accompanying drawings:

Fig. 1 is a top plan view of the forward part of a motor car equipped with a hood control embodying my invention, the hood being shown in the closed position and the hood-latching and controlling means being shown in dotted lines;

Fig. 2 is a side elevation, with parts broken away and others in section, of the hood and hood-latching mechanism shown in Fig. 1, the hood being in the closed and latched position;

Figs. 6 and 7 are views corresponding to Figs. 3 and 4, illustrating the position of the parts when the hood has been released and moved upwardly by the hood-lifting means;

Fig. 8 is a section on line 8—8 of Fig. 6;

Fig. 9 is a detail section taken approximately on line 9—9 of Fig. 1, showing one of the hood-latching devices or catches in the latched position;

Fig. 10 is a section on line 10—10 of Fig. 9;

Fig. 11 is a top plan view partly in section, corresponding to Fig. 9;

Fig. 12 is a section on line 12—12 of Fig. 9;

Fig. 13 is a transverse sectional view of one of the latch devices showing the position of the parts when the corresponding side of the hood is raised; and Fig. 14 is a transverse sectional view of one of the latch devices showing the parts in a position which they assume when the hood is lifted from the opposite side thereof.

Figure 3:
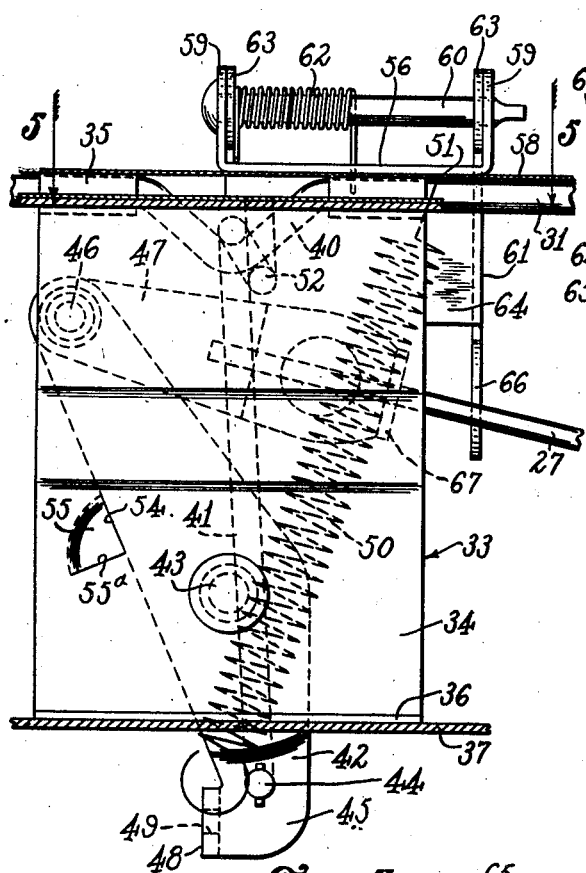
Fig. 3 is an enlarged view of a portion of the latching mechanism, the same being a sectional view taken approximately on the line 3—3 of Fig. 1.

In the form of hood control device selected for illustration, the hood of the car is of the type previously mentioned, that is, it comprises a single relatively rigid member adapted to swing transversely with respect to the car and so arranged that it may be lifted from either side. When lifted from either side, the other side of the hood acts with the lower support or fixed part of the engine enclosure to form a part of a suitable pivoting structure. If desired, the hood can be lifted off completely so that the engine is fully accessible. There are two latch devices or catches at each side of the hood, one toward the front and the other toward the rear. Each pair of latch devices or catches has a common rocking rod, the extremities of which are used for latching purposes. Each such rod has at its middle portion an operating crank portion, and the respective crank portions are connected to actuating lever devices which are operable from the interior of the car for effecting release of the respective latch mechanisms. Each rocking rod actuating mechanism has associated therewith means operable upon the release of the latch devices or catches at that side of the car to lift the hood to a certain degree from that side, although the hood will still be under the control of a safety catch such as is usually provided.

In the drawings the hood is shown at 20, the cowl portion of the vehicle at 21, the instrument board at 22, and the rear wall of the engine compartment at 23. In Fig. 1 I have shown the right-hand side of the hood provided with a hood latch mechanism generally indicated at 24, whereas a similar mechanism 25 is at the opposite side. Each of these devices is independently releasable from the interior of the car by means such as a knob 26 connected to a rod or heavy wire 27 passing through the partition 23 to the middle portion of the corresponding latch mechanism, the rear end of the rod or wire operating in a tube 28.

The latch mechanisms 24 and 25 are identical, and it will therefore suffice to describe the mechanism 25 and its adjuncts, shown in Fig. 2. It will be seen that it comprises a forward latching device or catch 29 and a rearward one 30, both of these having common thereto a rocking rod 31 arranged generally lengthwise of the car, the same being supported adjacent the upper edge of the fixed part 32 of the engine enclosure in a position such that crank portions formed at its respective ends can engage and disengage coacting latch parts carried at the lower edge portion of the hood.

Co-acting with the rod 31 at its middle portion is an actuating mechanism generally indicated at 33, and comprising a supporting plate 34 fixedly mounted in the lower stationary part of the engine enclosure, and in this particular case provided with bearings 35 in the form of bent-over ears in which the intermediate portion of the rocking rod is mounted.

Figure 4:
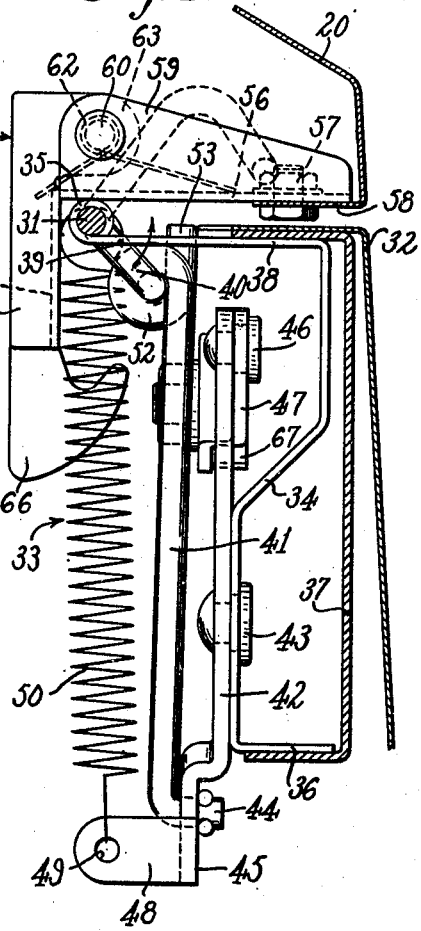
Fig. 4 is a transverse vertical section, showing the parts illustrated in Fig. 3, both of these views showing the positions of the parts when the hood is closed.
Figure 5:
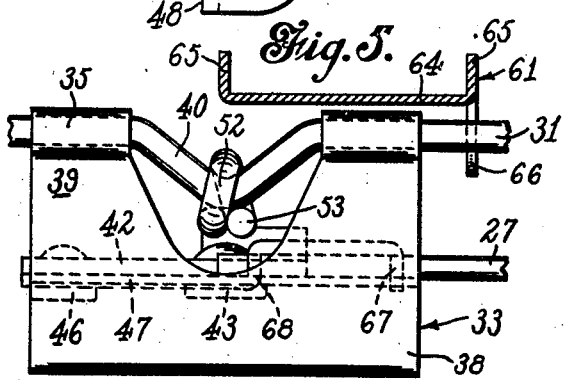
Fig. 5 is a sectional view on line 5—5 of Fig. 3.

Preferably the supporting plate 34 has the cross-sectional shape shown in Fig. 4, having a lower flange 36 welded to the lower flange of a sheet metal member 37. At its upper end, plate 34 has a flange portion 38 horizontally arranged and welded to the upper flange of member 37, and from the flange 38 project, in regions adjacent the ends of plate 34, lugs 39. The lugs 39 are bent over at the ends to provide the bearings 35 for the rocking rod.

Intermediate the bearings 35 the rocking rod is bent into the shape of a shallow V, as indicated at 40, to provide a crank-like portion, and this crank-like portion is connected to an actuating rod 41 located behind plate 34 in depending relation with respect to the rocking rod. The lower end of the rod 41 is connected to a lever 42 pivoted intermediate of its ends to plate 34 by means of pivot member 43. The lower end of rod 41 is turned laterally, as indicated at 44, to provide a part engaging an opening in the lower end portion 45 of lever 42 so as to pivot the lower end of the rod to the lower end of the lever. At its opposite end lever 42 is pivoted by means of pivot member 46 to an arm 47, the free end portion of which is attached to the forward end of the operating rod 27 previously mentioned. At its lower end the lever 42 is provided with an inturned lug 48 having an opening 49 in which is hooked one end of a helical spring 50, the opposite end of said spring being connected to a suitable fixed part. In this particular case the opposite end of the spring is connected to a part of the rocking rod 31, being provided with a hooked portion engaging said rod at a point adjacent the upper right-hand corner of the supporting plate, as indicated at 51 (Fig. 3).

The upper end portion of rod 41 is connected to the crank portion 40 preferably by being formed with a crank-engaging bend or eye 52, and this bend or eye is continued to provide a short upward extension on the rod, indicated at 53. This extension 53 is adapted to act as a hood-raising means, as hereinafter explained. It operates in the cut-away portion between the lugs 39, and in the latched position of the hood occupies the position shown in Fig. 4, where it is substantially flush with the upper margin of the lower engine-enclosing member 32. When the parts are in the position shown in Figs. 3 and 4, lever 42 is stopped by engagement of its side edge with an edge portion 54 of a sheet metal stop lug 55 struck up out of the body of the supporting plate. In this position the spring 50, pulling upwardly on the lower end of lever 42, holds the lever against the stop in the relation mentioned.

It will be noted that in the closed position of the hood, as shown in Fig. 4, there is only a small interval between the lower margin of the hood and the upper margin of the cooperating engine-enclosing member, and it will be noted that the opening between the movable and fixed parts leads inwardly about on a line with the main portion of the rocking rod, and that the bearings for this rod are spaced inwardly to a substantial degree from the mouth of the opening, with the lifting portion 53 of rod 41 intermediate the mouth of the opening and the body portion of the rocking rod. Above the portion 53 of rod 41 is a horizontal portion of a safety catch member carried by the hood. In this particular case, portion 53 is adapted to impinge against a plate 56 connected by bolts 57 to an inwardly extending flange 58 provided at the lower margin of the hood 20. At the ends of the plate 56 are bent-up ears 59. Between the ears 59 is mounted a pivot pin 60, which serves for the pivotal mounting of a depending safety catch member 61 having a controlling spring 62. The catch member 61 is formed of sheet metal and has ears 63 embracing the pivot member 60, and it has a depending plate-like body 64 with end flanges 65, one of the end flanges 65 being continued downwardly to form an integral hook 66. In the closed position of the hood this hook 66 is located at a distance below a portion of the body of rocking rod 31, so that this portion and the hook cooperate in providing against more than limited upward movement of the hood. The depending part of the safety catch can, however, be swung inwardly against the action of spring 62 so as to be moved to an inoperative position, as hereinafter explained.

A preferred form of connection between the rod 27 and the arm 47 is best shown in Fig. 8, from which it will be seen that the end portion of the arm is bent to provide a transverse channel, with a flange 67 at the free end of the arm and a shouldered portion 68 parallel to flange 67. These portions are provided with perforations 67a and 68a, respectively, adapted to be engaged by the rod 27, and intermediate the parts 67, 68 the arm is provided with an aperture receiving a bolt member 69 having a transverse perforation 70 through which a portion of rod 27 extends. At the opposite face of the arm, bolt 69 is provided with a nut 71 by means of which pressure can be exerted on the bolt to lock the end portion of the rod firmly in place, and by means of this connection the arm and the rod can be adjusted relatively to each other in a lengthwise direction. The connection is also easily detachable, as will be understood.

In Figs. 9 to 12, inclusive, I have illustrated the structure of the latch or catch device at the right-hand end of the rocking rod shown in Fig. 2, and as all of these latching devices are of identical construction, a description of one will suffice. Near the corresponding extremity of the rocking rod, the rod is provided with a suitable bearing which may comprise a sheet metal strap member 72 attached to the upper marginal portion of the lower enclosure by means such as screws 73, and having an inner slightly overhanging end portion 74 bent over to form a rod bearing. The end portion of the rod is bent preferably in the manner disclosed in the drawings so as to provide a crank-like portion 75 whose extremity 76 is adapted to retain and release a cooperating catch member carried by the hood. In the present instance the cooperating catch member is a plate 77 suitably secured to the hood at its lower margin. In this case the plate 77 is above and in contact with the flange 58 of the hood, which flange runs continuously along the side of the hood. It is secured to this flange in any appropriate manner, as by welding. Plate 77 preferably has in plan the shape shown in Fig. 11, being provided with a portion 78 adapted to be engaged by the rod extremity, as shown in that view. The crank portion at the end of the rod is formed with a definite hump or bend 79 therein, and when the parts are in the latching position shown in Fig. 10, a part of the rod extends from the bearing rearwardly and upwardly to the summit of the bend, this portion being indicated at 80, while from the summit of the bend a portion of the rod is directed downwardly and outwardly, as indicated at 81. At its lower part this portion 81 is joined to the terminal portion 76 above referred to.

To the right of the portion 78 (Fig. 11) plate 77 is made considerably wider, and the wide portion is provided with a transverse slot 82 adapted to engage a pivoting and centering projection 83 carried by the lower part of the enclosure. This projection 83 is at one end of a plate 84 attached to the lower enclosure member by means such as bolts 85, and preferably the projection 83 is formed by bending up one end of the plate. The projection is preferably of plate-like character, as shown, and is adapted to engage the end portions of the slot 82 when the hood is lowered into the closed position. Preferably the upper end of the projection 83 has the form shown, the same being somewhat rounded, and being provided with an integral stop lug 86 directed inwardly and upwardly, as shown in Fig. 10.

It is thought that from the previous description the positions of the various parts when the hood is latched in the closed position will be clear. The actuating mechanism for each rocking rod will then have the position shown in Fig. 3, where spring 50 is at the right-hand side of the pivot 43 and holds lever 42 against stop lug 55. When it is desired to open the hood from a given side, say the left-hand side, the corresponding knob 26 is grasped and pulled rearwardly. This pulls the arm or lever 47 in a rearward direction, causing the lower end of lever 42 to be swung forwardly, and this lower end begins to rise, carrying upwardly the rod 41, and the upper end portion of the rod 41 begins to swing the crank portion 40 in an upward direction, as indicated by the arrow in Fig. 4. As soon as portion 40 begins to move, each of the latching end portions of the rod begins to move upwardly from plates 77 to release the hood, and as the rod is being turned in its bearings, the humped crank-like portions of the rod continue to rise.

When the rod 41 has been raised to such an extent that its upper extremity 53 engages the lower face of plate 56, and upward movement is continued, the hood will be lifted from that side, pivoting on the projections 83 at the opposite side of the hood in the manner hereinafter described. Shortly after the hood-lifting portion of rod 41 has come into operation, the lower end of lever 42 will reach a point where the rod connection 41 goes past the center of the pivot 43, and when this occurs the spring 50 will immediately contract and cause the levers to be moved to the position shown in Fig. 6. In this operation the lower end of lever 42 is swung upwardly and rod 41 raised to a greater extent, thereby lifting the hood to the position shown in Figs. 6 and 7, and when the hood has been raised to the proper extent, the lever 42 has a portion of its side edge come into contact with an edge 55$^a$ of lug 55, to be stopped thereby. Thus the hood will not be raised to any greater extent by the lifting mechanism. However, the attendant at the service station may then, by virtue of the available space between the lower margin of the hood and the upper margin of the fixed lower member (Fig. 7), introduce his hand to push against the plate portion 64 of the safety catch. In this manner the safety catch can be manipulated to swing the hook out of the path of rod 31 so as to permit the hood to be fully raised.

When the hood has been raised to the full extent by the lifting mechanism, the end crank portions of the rocking rod will have reached the position such as indicated by the dotted lines in Fig. 10, and it will be understood, therefore, that in the further lifting of the hood these crank portions will offer no obstruction or hinderance. This is also shown in Fig. 13, which shows two positions of the free side of the hood in being lifted. In this operation the plates 77 move up freely with respect to the associated projections 83. In the meantime the opposite side portion of the hood is pivoting with relation to the underlying support in a manner such as indicated in Fig. 14. Under such conditions the corner portion of the hood cross section pivots on the underlying plate 84 and partly on the projection 83, which projection somewhat controls the upward swing of plate 77. It will be noted from Fig. 14 that this pivoting action requires some upward movement of the extremity of the crank portion of the rod. This upward movement of the crank extremity necessitates no translating movement of the middle portion of the rocking rod, because the rod, being made of resilient material, has sufficient resiliency to permit the necessary upward twist or torsion of the latching or catch portion.

As will be evident from Fig. 14, the lug 86 will act as a stop to prevent the hood from being swung beyond a predetermined angle. If the hood has been swung through a certain arc, the plates 77 at their inner portions come up against the side of the stop lug.

When the attendant at the service station lowers the hood again, it swings down so that at its middle portion it takes the position shown in Figs. 6 and 7. The plates 77 at that side of the car come down over and are centered and guided by the projections 83, the upper portions of the projections being within the slots 82. The hood can then be forced toward the completely closed position against the action of the spring-pressed rod 41. This will be assisted by the pushing forward of the corresponding knob 26 from the interior of the car. The rod 27 will be sufficiently stiff to push forward the rear end portion of the arm or lever 47, and this will swing the lever 42 in a counterclockwise direction (Fig. 6), and when the rod connection 41 passes beyond the center of the pivot member 43, the spring, which has been under increasing tension, is enabled to contract and restore the actuating mechanism quickly to the position shown in Fig. 3. In so doing the latching crank portions are moved to latching position, and the hood-lifting portion of rod 41 carried downwardly to the position shown in Fig. 4. By the movement of rod 41 past the fulcrum of lever 42, as just described, under the influence of the spring, the latches are effectively held or dogged in their latching positions.

By my invention the latching of a hood of the side-pivoted or dual tip type can be effectively controlled from the interior of the car. Release of the plural latching devices, some of which are located at one side of the car and others of which are located at the opposite side, can be readily brought about by manipulation from the front seat of the car, using one or the other of the releasing knobs or like devices as may be desired. Access to the parts within the hood except by authorized persons is prevented. The operation of the latching devices at a given side of the car can be effectively controlled by a single controlling member within the car, notwithstanding the fact that one latch is located at some distance in front of the other, and notwithstanding the fact that the actuating rod or like element, movable from the car interior, is disposed more or less in line with the front and rear latches. As disclosed in Fig. 1, there is a slight angle between this rod and the rocking rod of the latch mechanism, but approximately the two rods are in line, and yet the actuating mechanism operates very effectively. The action of the actuating mechanism is greatly assisted by a spring acting on an intermediately pivoted lever to throw it to one side or the other of the pivot or dead center. This spring also has a novel hood-raising action, as previously explained. In the particular form shown, the same rod which operatively connects the rocking latch rod to one of the actuating levers for actuation of the latching rod, acts additionally as a means for engaging and lifting that side of the hood which is being freed. Practically as soon as the hood is released at one side it is raised at that side by simple mechanism to an extent which permits the attendant to complete the hood-raising movement. Yet, notwithstanding all of these advantages, the mechanism is relatively inexpensive and can be easily installed.

While I have shown herein but one embodiment of my invention, it will be understood that it is capable of many different embodiments, and that various modifications and changes in the organization of parts and in the details can be made without departing from the principles of the invention or the scope of the claims.

What I claim is:

1. In a latch mechanism for releasably securing a dual-tip hood upwardly swingable from either side to the fixed part of an engine enclosure, a plurality of latch devices for latching together the fixed and movable parts, two of said devices being located toward the front end of the hood at opposite sides thereof and two being located toward the rear end of the hood at opposite sides thereof, the devices at each side of the hood having a common latching member in the form of a rocking rod having crank-like latching extremities, said rocking rods having intermediate of their ends crank-like operating portions, operating rods at the respective sides of the car operable from the car interior and operatively connected to said operating portions, and means at each side margin of the hood for supporting it from beneath in a pivotal manner when the hood is lifted from the opposite side, the latching extremities being arranged to yield when the hood pivots at the corresponding side so as to facilitate the pivotal movement.

2. In a latch mechanism for releasably securing a dual-tip hood upwardly swingable from either side to the fixed part of an engine enclosure, a plurality of latch devices for latching together the fixed and movable parts, two of said devices being located toward the front end of the hood at opposite sides thereof and two being located toward the rear end of the hood at opposite sides thereof, the devices at each side of the hood having a common latching member in the form of a rocking rod having crank-like latching extremities, said rocking rods having intermediate of their ends crank-like operating portions, operating rods at the respective sides of the car operable from the car interior and operatively connected to said operating portions, means operable by each operating rod when and as the corresponding latch devices are released and acting on the corresponding marginal portion of the hood for raising the hood, said rocking rods having bearings in a location adjacent the upper margin of said fixed part of the engine enclosure, and the crank-like extremities of said rods being adapted to engage the inner marginal portion of the hood and being of humped formation, and means at each side margin of the hood for supporting it from beneath in a pivotal manner when the hood is lifted from the opposite side, the latching extremities being arranged to yield when the hood pivots at the corresponding side so as to facilitate the pivotal movement.

3. A hood latch for dual-tip hoods upwardly swingable from either side comprising plates attached to the lower fixed part of the engine enclosure and having bent-up guiding and centering projections, the hood carrying at the margins plates with transverse slots engageable with said projections, and the lower fixed part being provided at each side with a rocking rod having humped crank-like extremities adapted in one position to overlie portions of said last-named plates at the corresponding side of the hood.

4. In a latch device for latching a side-pivoted hood to a fixed part of the engine enclosure, a rocking rod mounted on the fixed part and having extremities adapted to engage the side margin of the hood to latch it down, and a spring-pressed safety hook on the hood engaging under the body of the rocking rod.

5. In a latch mechanism for releasably securing a dual-tip hood upwardly swingable from either side to the fixed part of an engine enclosure at the respective sides, the side margins of the hood each being provided in front and rear positions and at spaced points with transverse slots, and the lower fixed part of the engine enclosure being provided with guiding and centering projections which in the closed position of the hood extend upwardly into said slots, the hood being arranged to pivot directly on the margins of the lower fixed part under the control of said projections, a generally longitudinally disposed latching member at each side of the hood in the form of a somewhat resilient rocking rod having crank-like latching extremities for latching the hood at the corresponding side by engaging over the hood margin at points adjacent the corresponding guiding and centering projections, and means connected with the intermediate parts of said rocking rods for operating them from the interior of the car.

6. In a latch mechanism for releasably securing a dual-tip hood upwardly swingable from either side to the fixed part of an engine enclosure at the respective sides, the lower margins of the hood at the respective sides being arranged to pivot directly on the upper margins of the lower fixed part and there being means for centering and guiding the hood margins, a plurality of latch devices at each side of the hood for engaging and holding down the marginal portion of the hood, said devices including a common latching member constituted by a rocking rod having crank-like latching extremities and a crank-like intermediate operating portion, and means connected to said crank-like operating portions for operating said rods from the interior of the car, said last-named means including actuating rods connected to the intermediate operating portions and having upward extensions each adapted to engage under and lift the corresponding marginal portion of the hood when and as the hood is released at that side.

7. In a latch mechanism for releasably securing a side-pivoted hood to the fixed part of an engine enclosure, a latch device comprising a rocking rod disposed along the upper margin of the fixed part and having crank-like extremities to engage and hold down the hood margin and also provided with a crank-like operating portion, a mounting plate at the inner face of the fixed part, an intermediately pivoted lever on said plate, an actuating rod connected at one end to said lever and at the other end to said operating portion, the connection of said rod to said lever being at one side of the fulcrum of the latter, a pull rod operable from the interior of the car connected to said lever at the opposite side of the fulcrum of said lever, said actuating rod being movable from one side to the other of the lever fulcrum, and a spring acting on said lever.

8. A latch mechanism such as described in claim 7 in which the upper portion of the mounting plate has bearings for the rocking rod at opposite sides respectively of the operating portion of said rod and in which the actuating rod operates in a cut-away portion of the mounting plate and has an upper end extension engageable with the marginal portion of the hood to lift the hood as and when the hood is released.

9. A latch mechanism such as set forth in claim 7 in which the mounting plate has an upper end portion disposed substantially horizontally and provided with bearings in which portions of the rocking rod are mounted, the hood being equipped with a plate overlying the horizontal portion of the mounting plate and the hood plate carrying a spring-pressed safety hook engageable under the body of the rocking rod.

10. In a latch mechanism for releasably securing a dual-tip hood upwardly swingable from either side to the fixed part of an engine enclosure at the respective sides, the lower margins of the hood at the respective sides being arranged to pivot on the upper margins of the lower fixed part and there being at each side longitudinally spaced upwardly projecting centering and guiding projections adjacent the corresponding upper margin, plates carried by the lower marginal portions of the hood having apertures through which said centering and guiding projections extend upwardly, a plurality of latch devices at each side of the hood for holding down the marginal portion of the hood, said devices including a common latching member constituted by a rocking rod having crank-like latching extremities engageable from above with portions of the corresponding apertured plates for latching the hood, and means connected to said rods whereby they are operable from the interior of the car.

ARTHUR CLAUD-MANTLE.